United States Patent
Schenck et al.

[11] Patent Number: 5,839,756
[45] Date of Patent: Nov. 24, 1998

[54] INFLATABLE BLADDER

[75] Inventors: David Patrick Schenck, Miamisburg; Brian Joseph Thompson, Fairborn, both of Ohio

[73] Assignee: General Motors Corporation, Detroit, Mich.

[21] Appl. No.: 794,726

[22] Filed: Feb. 3, 1997

[51] Int. Cl.$^6$ ................................................. B60R 21/16
[52] U.S. Cl. ..................... 280/743.1; 280/732; 280/753
[58] Field of Search ............................. 280/732, 743.1, 280/753.4, 752, 730.1

[56] References Cited

U.S. PATENT DOCUMENTS

| | | | |
|---|---|---|---|
| 4,944,529 | 7/1990 | Backhaus | 280/743.1 |
| 5,005,481 | 4/1991 | Schneider et al. | 102/393 |
| 5,382,051 | 1/1995 | Glance | 280/751 |
| 5,445,414 | 8/1995 | Pittman et al. | 280/743.1 |
| 5,536,043 | 7/1996 | Lang et al. | 280/753 |
| 5,615,914 | 4/1997 | Galbraith et al. | 280/743.1 |
| 5,630,621 | 5/1997 | Schneider | 280/753 |
| 5,695,242 | 12/1997 | Brantman et al. | 297/216.1 |
| 5,697,640 | 12/1997 | Lolonde | 280/743.1 |

OTHER PUBLICATIONS

Research Disclosure—37715 "Inflatable Metal Bag for Side Door Stiffening" Jul. 1995.
Research Disclosure—37513 "Side Impact Protection Device" Jul. 1995.

*Primary Examiner*—Christopher P. Ellis
*Attorney, Agent, or Firm*—Kathryn A. Marra

[57] ABSTRACT

An inflatable restraint system includes an inflator for generating inflator gas and a bladder inflatable upon generation of gas by the inflator. The bladder includes a forward panel, a rearward panel, and a pair of opposing end panels extending between and interconnecting the forward and rearward panels. Preferably, the bladder is made of a metal material. Also preferably, the system includes an instrument panel having a lower portion and the bladder is positioned beneath the lower portion of the instrument panel to serve as a knee bolster when inflated for protection of the occupant.

12 Claims, 4 Drawing Sheets

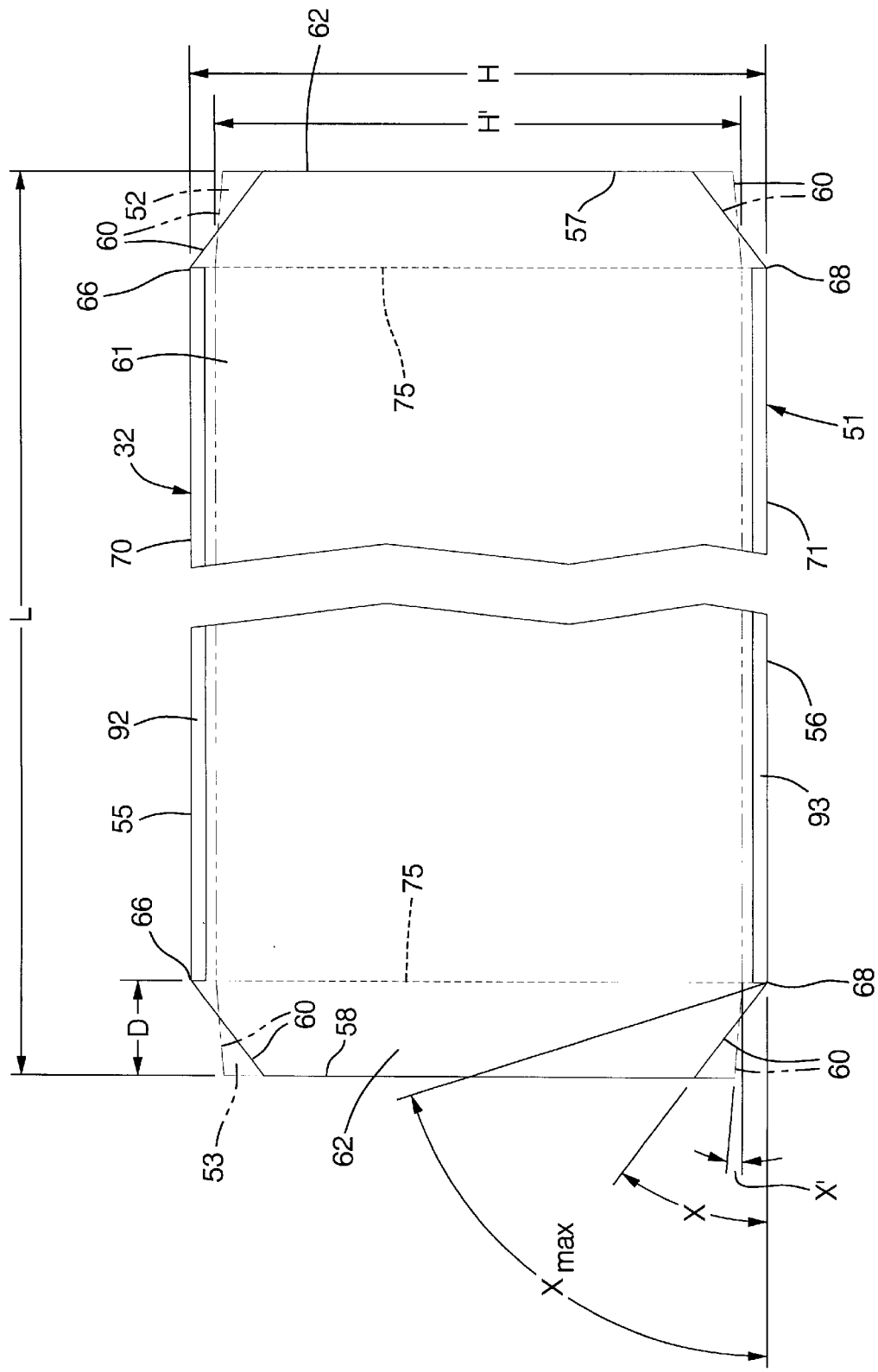

ably providing an inflatable restraint system for protection of
INFLATABLE BLADDER This invention relates to an inflatable bladder for restraining a vehicle occupant.

BACKGROUND OF THE INVENTION

It is well known in motor vehicles to provide an air bag module which is mounted beneath an opening in the instrument panel. The air bag module typically includes a canister having a canister opening and enclosing an inflator for generating gas to inflate an air bag for deployment out through the opening in the instrument panel. The air bag typically provides protection to the head and torso portion of a vehicle passenger.

It has also been suggested in the prior art to provide a knee bolster mounted on the instrument panel beneath the air bag for protection of the knee portion of the vehicle passenger. It is known that the knee bolster may be made of structural materials for absorbing energy, such as plastic or foam. It is also known that the knee bolster could be provided as a separate lower fabric air bag that deploys in addition to the main upper air bag. It is also known that a single fabric air bag mounted on the instrument panel may include an upper portion for protecting the head and torso of the passenger as well as an integral lower portion for protecting the knee portion of the passenger. It will be appreciated that the traditional fabric air bag deflates or is vented immediately after deployment so that it generally restrains for a single event.

It is also known in the prior art to provide an inflatable metal bladder which is constructed of two flat panels joined at their edges by a single continuous seam. Since the inflatable bladder has a thin profile when uninflated, it has been suggested for use as a side impact protection device which is mounted in the door of a vehicle. When the bladder inflates, it has a rounded, pillow-type shape which presents a generally rounded surface to the vehicle occupant. It will be appreciated that the thickness of the bladder is limited by the joined edges such that the bladder essentially converges to zero thickness around all of the edges. Thus, the bladder presents a generally uneven thickness to the occupant. Accordingly, the bladder may need to be made larger than needed, such that a consistent thickness is presented in the contacted portion of the bladder. In addition, the pillow-type bladder may experience creasing around its edges resulting in an uneven presentation to the occupant.

SUMMARY OF THE INVENTION

The present invention offers advantages and alternatives over the prior art. Advantageously, the invention preferably provides an inflatable bladder that presents a generally flat contact surface to an occupant and provides a generally constant thickness across the entire length of the bladder. Advantageously, the inflatable restraint system preferably provides a knee bolster for protection of a vehicle occupant that is compact for packaging in narrow vehicle locations. Also advantageously, a bladder is provided having features that preferably limit deformation or creasing of the bladder during inflation.

These advantages and more are accomplished by preferably providing an inflatable restraint system for protection of an occupant in a vehicle. The inflatable restraint system includes an inflator for generating inflator gas and a bladder inflatable upon generation of gas by the inflator. The bladder includes a forward panel, a rearward panel, and a pair of opposing end panels extending between and interconnecting the forward and rearward panels. Preferably, the bladder is made of a metal material. Also preferably, the system includes an instrument panel having a lower portion and the bladder is positioned beneath the lower portion of the instrument panel to serve as a knee bolster when inflated for protection of the occupant.

According to other preferred aspects of the invention, the end panels each include a pleat fold prior to bladder inflation and inflation of the bladder unfolds the pleat folds on each of the end panels such that the end panels expand to a predetermined thickness which generally defines the thickness of the inflated bladder. The pleat folds and the end panels are preferably stored in a generally flat condition between the forward and rearward panels prior to bladder inflation to provide a compact bladder for packaging.

Preferably each of the end panels has a generally hexagonal shape and each of the forward and rearward panels has a generally octagonal shape. Each of the end panels includes a forward side seam connecting each of the end panels to the forward panel and a rearward side seam connecting each of the end panels to the rearward panel. The forward and rearward side seams intersect to define a single lower point and a single upper point on each of the end panels.

In another preferred form of the invention, the forward and rearward panels each include an upper edge, a lower edge, and opposing side edges extending generally perpendicular to the upper and lower edges. Each of the panels includes four angled corner edges extending between the respective upper and side edges and lower and side edges and the angled corner edges extend at a predetermined initial corner angle relative to the upper and lower edges. Also preferably, the forward and rearward panels each have an initial height defining the initial height of the bladder and the bladder has a decreased final height as the forward and rearward panels expand outwardly during inflation such that the initial angle is decreased to a final corner angle upon bladder inflation.

According to other preferred aspects of the invention, the forward and rearward panels include upper edges joined to define an upper seam and lower edges joined to define a lower seam. The bladder preferably includes upper and lower rib portions reinforcing the upper and lower edges of the bladder, respectively, to limit deformation of the upper and lower edges during bladder inflation. The upper and lower rib portions are preferably separate pieces adhesively joined to the bladder.

BRIEF DESCRIPTION OF THE DRAWINGS

The present invention will now be described, by way of example, with reference to the accompanying drawings, in which:

FIG. 4 is a plan view of the inflatable bladder in an uninflated condition in solid lines and in the inflated condition in phantom lines, with the center partially-broken-away;

DESCRIPTION OF THE PREFERRED EMBODIMENT

Figure 1:
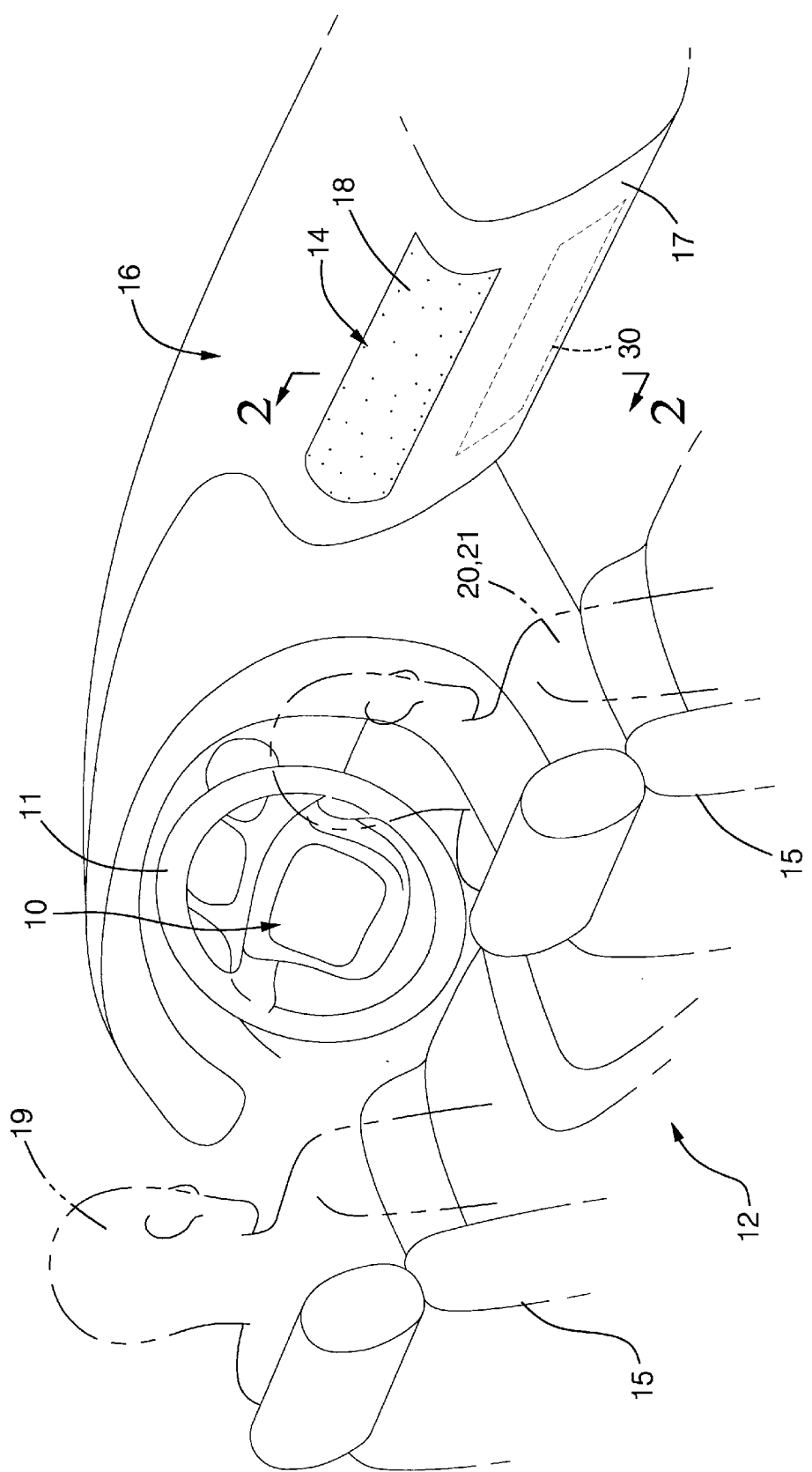
FIG. 1 is an overall perspective view of a vehicle interior showing driver's side and passenger side occupants and showing a passenger-side knee bolster assembly mounted beneath a passenger-side air bag module, the air bag module and the knee bolster both being in an uninflated condition.

Referring to FIG. 1, a vehicle interior 12 includes a passenger side air bag module 14 mounted beneath an instrument panel 16 and a driver's side air bag module 10 mounted on a vehicle steering wheel 11. The driver's side module 10 and passenger side module 14 are each normally covered by a cover door, indicated at 18 for the passenger side module 14. The vehicle interior 12 further includes seats 15 in which driver's side and passenger side occupants 19, 20 are normally seated as shown in FIG. 1.

Figure 2:
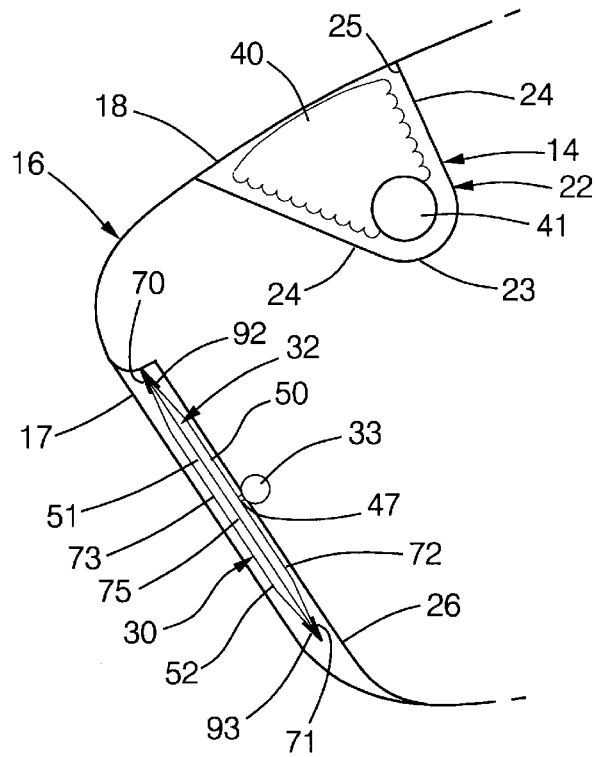
FIG. 2 is a schematic sectional view taken along line 2—2 of FIG. 1 and showing the air bag module and the knee bolster assembly including an inflatable metal bladder, both the air bag and the bladder being in an uninflated condition.
Figure 3:
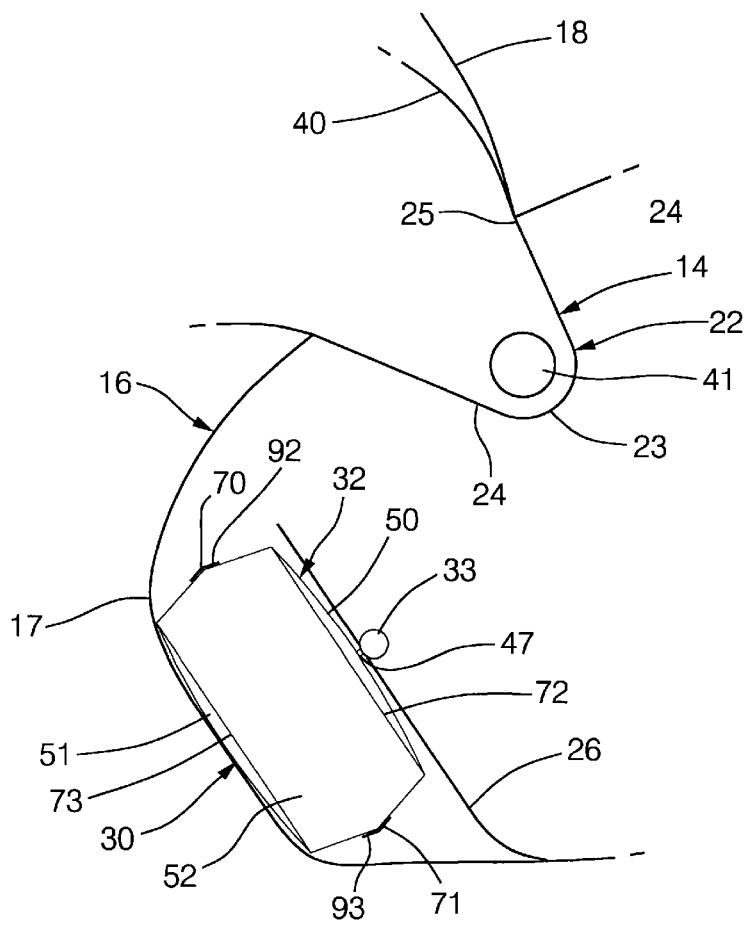
FIG. 3 is a view similar to FIG. 2, but showing the inflatable bladder and the air bag both in an inflated condition.

Referring to FIGS. 1–3, the vehicle interior 12 further includes a knee bolster assembly 30 indicated in phantom lines in FIG. 1. The knee bolster assembly 30 is preferably mounted beneath an outer instrument panel layer 17, which is preferably made of foam covered by a plastic skin. The knee bolster assembly 30 preferably includes an inflatable bladder 32, preferably made of metal, which is inflatable for protection of the lower leg and knee portions of the passenger 20, as described in detail below.

As best shown in FIGS. 2 and 3, the passenger side module 14 includes a canister 22, being made of a metallic or other suitable material, and having a curved bottom wall 23 and upstanding side walls 24 cooperatively defining a canister opening 25. The passenger side module 14 further includes an air bag 40 and an air bag inflator 41 for generating gas to inflate the air bag 40 under certain predetermined vehicle conditions. The passenger side module 14 is located beneath an instrument panel opening normally closed by the hinged cover door 18. The cover door 18 preferably includes weakened portions (not shown) so that the inflating air bag 40 forces open the cover door 18 during deployment. The passenger side air bag module 14 is preferably located on an upper or middle portion of the instrument panel 16. Upon the sensing of a certain predetermined amount of longitudinal deceleration, the air bag inflator 41 generates gas and the air bag 40 is inflated to protect generally the head and torso portions 21 of the passenger 20.

The knee bolster assembly 30 includes an inflatable metal bladder 32 and an inflator 33 for generating gas to inflate the bladder 32. As best shown in FIGS. 2 and 3, the knee bolster assembly 30 is mounted to underlying support structure 26 beneath the outer instrument panel layer 17 in a lower portion of the instrument panel 16. The inflator 33 is preferably located generally forward and outside of the bladder 32 and is mounted to the bladder 32. The inflator 33 may be of any conventional construction for generating gas to inflate the bladder 32 upon sensing certain predetermined vehicle conditions, such as a sudden longitudinal deceleration. Preferably, the inflator 33 is connected to the bladder 32 by a threaded inflator tube 48 which includes an inner bore passageway 49 for gas to travel from the inflator 33 into the interior of the bladder 32. Advantageously, the inflator tube 48 extends through the underlying support structure 26 and anchors both the bladder 32 and the inflator 33 to the support structure 26 for secure attachment to the vehicle.

Referring to FIG. 4, the inflatable bladder 32 is preferably made of metal. More specifically, the bladder 32 includes a forward main panel 50 facing away from the passenger 20 and being adjacent the support structure 26 and inflator 33, and a rearward main panel 51 generally facing the passenger 20 and located adjacent the outer instrument panel layer 17. The forward and rearward main panels 50, 51 are each preferably made of a thin metal material and preferably have an identical size and shape. Each of the main panels 50, 51 preferably has a generally octagonal shape prior to inflation as best shown in FIG. 4. Each of the panels 50, 51 includes a generally laterally extending upper panel edge 55, a generally laterally extending lower panel edge 56, and generally vertically extending right and left side edges 57, 58. In addition, the main panels 50, 51 each include four angled corner edges 60 extending between each of the upper and lower panel edges 55, 56 and the side edges 57, 58. The main panel portions 50, 51 each include a rectangular central portion 61 and two opposing angled side edge portions 62. The angled side edge portions 62 are generally quadrangular with three edges defined by two of the angled corner edges 60 plus one of the side edges 57, 58 and a fourth edge continuous with the rectangular central portion 61 of the main panels 50, 51.

Figure 6:
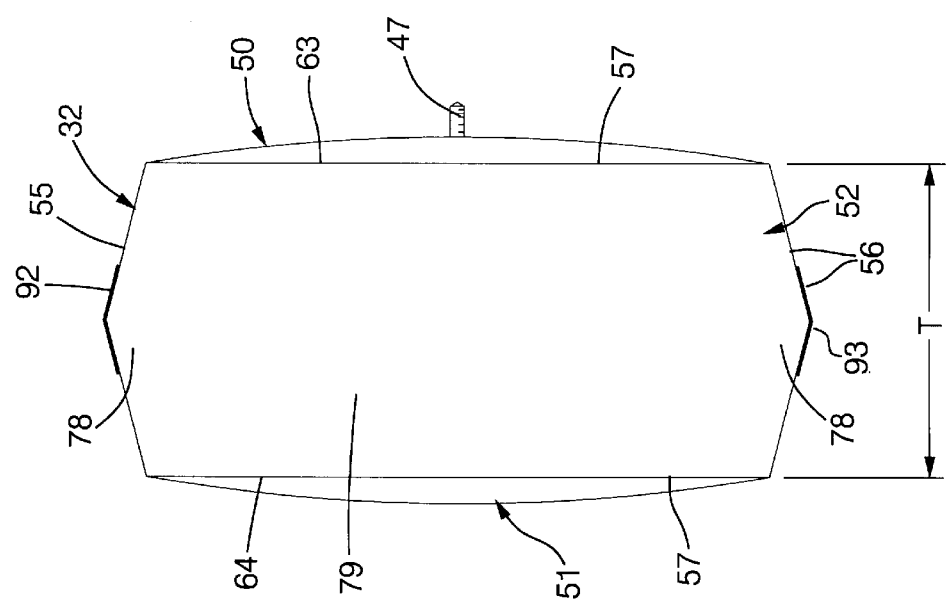
FIG. 6 is an end view of the inflatable bladder similar to FIG. 5, but with the bladder in the inflated condition.

The bladder 32 further includes right and left end panels 52, 53. The end panels 52, 53 are also preferably formed of a relatively thin metal material. As best shown in FIG. 6, the end panels 52, 53 each preferably have a generally hexagonal shape. The end panels 52, 53 each include generally vertically extending forward and rearward edges 63, 64 which terminate in upper and lower angled edges 65 best shown in FIGS. 5 and 7 which converge towards each other to intersect at upper and lower points 66 and 68. The end panels 52, 53 each have a generally constant thickness portions 79 and upper and lower triangular flap portions 78 including angled edges 65 converging at points 66 and 68. In addition, the angled edges 65 of the end panels 52, 53 are joined to the respective mating angled corner edges 60 of the main panels 50, 51. Thus, the main panels 50, 51 and the end panels 52, 53 have converging angled corner edges 60 and angled edges 65 which all converge and intersect only at the two upper points 66 and two lower points 68.

Figure 7:
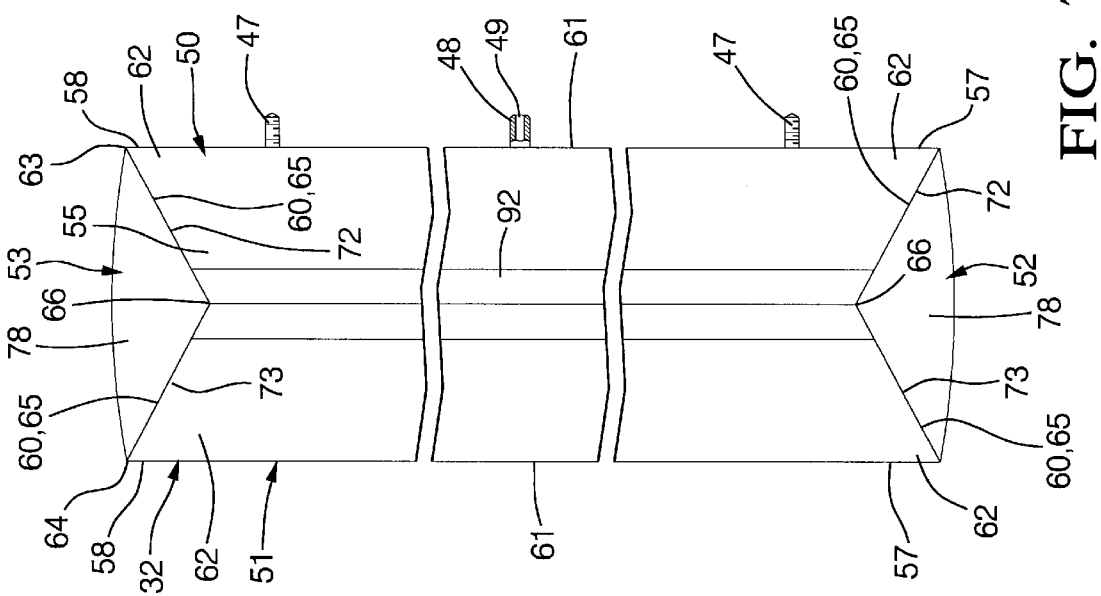
FIG. 7 is a top view of the inflatable bladder in the inflated condition, with portions partially-broken-away.

When the bladder 32 is constructed, the upper panel edges 55 are joined to form a generally laterally extending upper seam 70 and the lower panel edges 56 are joined to form a generally laterally extending lower seam 71. The end panels 52, 53 including the forwards and rearward edges 63, 64 and the angled edges 65 each intersect the forward and rearward main panels 50, 51 at the right and left side edges 57, 58 and the angled corner edges 60 to form a forward side seam 72 and a rearward side seam 73 on each of the end panels 52, 53 of the bladder 32. The seams 70, 71, 72, 73 are provided in any suitable manner, such as by welding. The upper seam 70 and forward and rearward side seams 72, 73 all intersect each other only at the upper points 66 as best shown in FIG. 7. The lower seam 71 and forward and rearward side seams 72, 73 all intersect each other only at the two lower points 68. Thus, it will be appreciated that the forward and rearward side seams 72, 73 are spaced apart from each other upon bladder 32 inflation and only intersect at their uppermost ends at the two upper points 66 and at their lowermost ends at the two lower points 68 as best shown in FIG. 6.

The bladder 32 has an initially uninflated condition as illustrated in FIGS. 1, 2, 4 and 5 and an inflated condition as illustrated in FIGS. 3, 6 and 7 and in phantom lines in FIG. 4. As shown in FIG. 4 in solid lines and in FIG. 5, when the bladder 32 is in the uninflated condition, the forward and rearward panels 50, 51 are in a generally flat condition overlying one another. The bladder 32 has an initial height H which is defined by the height of the main panels 50, 51 when the bladder 32 is uninflated. Also when the bladder 32 is uninflated, the angled edge portions 62 include a dimensional width D defined between the rectangular central portion 61 and the side edges 57, 58.

As shown in FIG. 4, prior to inflation of the bladder 32 each of the angled corner edges 60 forms a corner angle X with respect to one of the upper and lower panel edges 55, 56. The initial value of the corner angle X, and thus the angle of the corner angle edges 65, are crucial to successful inflation of the bladder 32. The corner angle X may have a maximum value of the inverse tangent of half the height (0.5 H) divided by the width D. For example, if D is 2 inches (50.8 mm) and the initial height is 12 inches (304.8 mm), then the maximum possible initial corner angle X is about 72 degrees. However, the preferred initial value of the corner angle X is less than the maximum value allowable for the corner angle X. It will be understood that the initial corner angle X changes upon inflation of the bladder 32 and decreases to a final corner angle X' as the bladder 32 is inflated as best shown in FIG. 4. This occurs since the height H of the bladder 32 decreases to a final height H' upon inflation as the angled corner edges 60 and the angled edges 65 expand in the forward and rearward directions as the thickness of the bladder 32 increases. When the bladder 32 is inflated, the overall height is decreased to a final height H' as shown in phantom lines in FIG. 4 and in solid lines in FIG. 6. For example, the height H may decrease from 12 inches (304.8 mm) to about 9 inches (228.6 mm). Also when the bladder 32 is inflated, the initial corner angle X is decreased. Most preferably, the initial corner angle X is set to a predetermined value such that the final corner angle X' approaches zero after the bladder 32 is inflated. This is the preferred configuration of the bladder 32 for the following reasons.

When the initial corner angle X approaches the maximum value, the forward and rearward main panels 50, 51 are greatly sloped or rounded and would not present a generally flat rearward panel 51 to the occupant 20 to contact. As the initial angle X approaches zero, the bladder 32 material becomes highly stressed during inflation and could rupture or tear. Thus, preferably the initial corner angle X should be set such that the final corner angle X' is preferably about zero. Also, the initial corner angle X should be less than the maximum angle. For example, for a bladder 32 in which D is 2 inches (50.8 m) and the height is about 12 inches (304.8 mm), the initial corner angle X is preferably about 37 degrees and the final corner angle X' is preferably about 0 degrees. However, preferred values of the initial corner angle X would range from about 37 degrees to about 50 degrees to provide a final corner angle X' of zero or slightly greater than zero and to maintain a generally flat rearward panel 51 upon inflation and to prevent high stresses in the corners of the bladder 32. As another example, an initial corner angle X of about 45 degrees would result in a final corner angle X' of about 14degrees and would result in a generally flat rearward panel being presented to the occupant 20.

It will further be appreciated that prior to inflation, the end panels 52, 53 are each folded inwardly and preferably in half to form pleat folds 75. It is crucial for successful inflation of the bladder 32 that the end panels 52, 53 each have thickness T equal to twice the width D of the angled side edge portions 62. The pleat folds 75 are preferably located at the center of the end panels 52, 53. The thickness T of the end panels 52, 53 controls the thickness of the bladder 32 upon inflation. Thus, the bladder 32 generally has a thickness at least equal to the thickness T of the end panels 52, 53 upon inflation. Advantageously, the addition of the end panels 52, 53 between the forward and rearward main panels 50, 51 enables the bladder 32 to have a generally even thickness across the entire length L of the bladder 32. Thus, the sides of the bladder 32 do not decrease to zero thickness as in the pillow-type bladders 32 of the prior art, such that the bladder 32 can advantageously be made only as large as needed while providing a consistent thickness. In addition, the angles corner edges 60 and angle edges 65 also enable the constant thickness of the bladder 32 in the inflated condition as best shown in FIG. 7.

Figure 5:
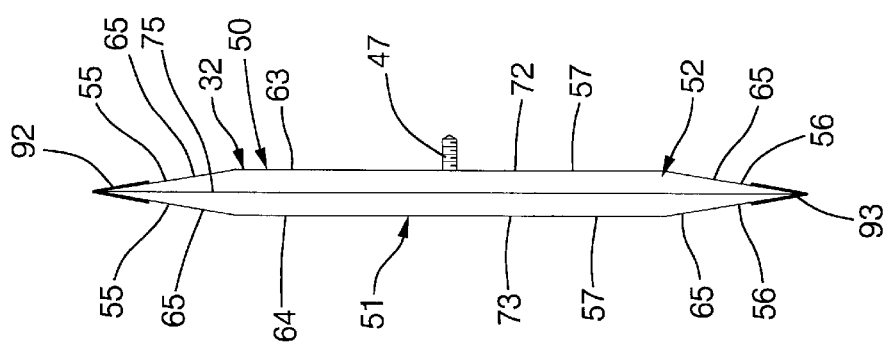
FIG. 5 is an end view of the inflatable bladder in the uninflated condition.

As best shown in FIGS. 2, 4 and 5, prior to inflation the bladder 32 has a generally flat profile with the pleat folds 75 being located inward and between the forward and rearward main panels 50, 51 as enabled by the end panels 52, 53 having a thickness T equal to twice the width D of the angled side edge portions 62. Thus, the bladder 32 can be compactly stored in a narrow location. As shown in FIG. 2, the bladder 32 is preferably stored beneath the outer instrument panel layer 17 on the lower portion of the instrument panel 16. The layer 17 is preferably made of skin and foam materials. The bladder 32 is preferably mounted to the underlying support structure 26 by mounting fasteners 47 in addition to also being held in place by the threaded inflator tube 48 as best shown in FIG. 7. It will be appreciated that the inflator 33 may be attached to the bladder 32 at any location for transmitting gas into the bladder 32 through any inlet, such as passageway 49.

Upon the sensing of predetermined conditions of vehicle deceleration, the inflator 33 discharges inflator gas into the bladder 32. As best shown in FIG. 3, the bladder 32 is inflated and preferably stretches the outer instrument panel layer 17 upon expansion. A generally flat rearward panel 51 is presented to the occupant 20 for contact with the lower leg and knee portion of the occupant 20. The occupant 20 contacts the knee bolster assembly 30 and the bladder 32 absorbs energy as it is contacted and deformed by the occupant 20. Simultaneously, the air bag 40 may be inflated by the air bag inflator 41 for protection of the head and torso portions 21 of the occupant 20. The same sensing device may provide the signal to both inflators 33, 41. As shown in FIGS. 6 and 7, the bladder 32 is inflated to a generally consistent thickness and enabled by the end panels 52, 53 and the angled corner edges 60 and angled edges 65.

It will be appreciated that the end panels 52, 53 have a constant thickness portion 79 having the thickness T for a vertical height which is about equal to the final inflated height H' of the forward and rearward main panels 50, 51. As best shown in FIGS. 6 and 7, in the inflated condition, angled upper and lower flap portions 78 of the end panels 52, 53 formed by the angled edges 65 are laterally bent with respect to the constant thickness portion 79 of the end panels 52, 53 and generally wrap around the upper and lower sides of the bladder 32 to converge with the upper seam 70 at the upper points 66 and the lower seam 71 at the lower point 68. This enables the bladder 32 to have a generally consistent thickness when inflated equal to at least the thickness T of the end panels 52, 53.

As best shown in FIGS. 4–7, the bladder 32 preferably includes an upper rib portion 92 and a lower rib portion 93. The rib portions 92, 93 are each preferably made of a generally rigid material, such as metal. The upper rib portion 92 overlies and covers the upper seam 70 and the lower rib portion 93 overlies and covers the lower seam 71. The upper and lower rib portions 92, 93 preferably extend generally across the entire lateral length L of the forward and rearward main panels 50, 51 and are generally flat strips bent to conform to the shape of the forward and rearward main panels 50, 51. Advantageously, the upper and lower rib portions 92, 93 prevent deformation, such as buckling, of the upper and lower panel edges 55, 56 during bladder 32 inflation. Thus, the upper and lower rib portions 92, 93 add strength and support to the bladder 32 for maintaining its shape during inflation and for keeping the upper and lower panel edges 55, 56 generally straight during inflation. Preferably, the upper and lower rib portions 92, 93 are attached to the bladder 32 in a manner which does not impinge upon the bladder 32, such as by an epoxy or other adhesive.

Also advantageously, the bladder 32 preferably does not include vents and retains the gas after the first event. Thus, the knee bolster assembly 30 is still available for protection during secondary events after initial inflation. Advantageously, the bladder 32 presents a generally flat rearward panel 51 to the passenger 20. In addition, the bladder 32 has a generally consistent thickness across the entire length and height of the bladder 32. Thus, the bladder 32 can be sized to closely match the area of desired protection of the passenger 20 and need not be made bigger to account for lesser thickness, especially at the outer lateral ends as in the single seam pillow-shaped bladders of the prior art. Furthermore, it will be appreciated that the upper and lower rib portions 92, 93 keep the upper and lower panel edges 55, 56 of the bladder 32 in a generally straight condition during inflation of the bladder 32 such that creases are not created on the upper and lower panel edges 55, 56.

It will be understood that a person skilled in the art may make modifications to the preferred embodiment shown herein within the scope and intent of the claims. While the invention has been illustrated for use on the passenger side of the vehicle, it will be appreciated that the knee bolster assembly 30 including the inflatable bladder 32 is equally useful on the driver's side of the vehicle and could be mounted beneath the instrument panel 16 at a location generally below the steering wheel 11 for protection of the driver's side occupant 19. While the bladder 32 is shown preferably used in a knee bolster assembly 30, it will be appreciated that the bladder 32 could be used anywhere in the vehicle due to its compact initial condition, and especially in a vehicle door (not shown). While the bladder 32 is shown as stretching the outer instrument panel layer 17 during inflation this is not meant to be limiting. It will be appreciated that the bladder 32 could also deploy through an opening in the instrument panel 16, from behind a tethered door, from behind the instrument panel layer 17 into available empty space, or by completely or partially rupturing the instrument panel layer 17. It will further be appreciated that forward and rearward panels are merely relative terms and the rearward panel 51 is simply the panel that faces the occupant 20 regardless of the bladder 32 orientation in the vehicle and the forward panel 50 is simply the opposite the rearward panel 50 and facing away from the occupant 20.

While the present invention has been described as carried out in specific embodiments thereof, it is not intended to be limited thereby but is intended to cover the invention broadly within the scope and spirit of the claims.

What is claimed is:

1. An inflatable restraint system for protection of an occupant in a vehicle, the inflatable restraint system comprising:

an inflator for generating inflator gas; and
a bladder inflatable upon generation of gas by the inflator, the bladder including a forward panel, a rearward panel, and a pair of opposing end panels extending between and interconnecting the forward and rearward panels;

the forward and rearward panels each including an upper edge, a lower edge, and opposing side edges extending generally perpendicular to the upper and lower edges and wherein each of the panels includes four angled corner edges extending between the respective upper and side edges and lower and side edges and wherein the angled corner edges extend at a predetermined initial corner angle relative to the upper and lower edges.

2. The inflatable restraint system of claim 1 wherein the forward and rearward panels each have an initial height defining the initial height of the bladder and wherein the bladder has a decreased final height as the forward and rearward panels expand outwardly during inflation and wherein the initial corner angle is decreased to a final corner angle upon bladder inflation.

3. The inflatable restraint system of claim 2 wherein the final corner angle is greater than or equal to zero.

4. The inflatable restraint system of claim 2 wherein the final corner angle is approximately zero.

5. The inflatable restraint system of claim 2 wherein the initial corner angle is in the range of 37 degrees to 50 degrees.

6. The inflatable restraint system of claim 1 wherein the forward and rearward panels each include a generally rectangular central portion and angled side edge portions having a generally constant central width and including the angled corner edges converging inwardly to intersect the respective upper and lower edges and wherein the end panels each have a thickness equal to twice the central width of the angled side edge portions.

7. An inflatable restraint system for protection of an occupant in a vehicle, the inflatable restraint system comprising:

an inflator for generating inflator gas; and
a bladder inflatable upon generation of gas by the inflator, the bladder including a forward panel, a rearward panel, and a pair of opposing end panels extending between and interconnecting the forward and rearward panels;

the forward and rearward panels each including an upper edge, a lower edge, and opposing side edges extending generally perpendicular to the upper and lower edges and wherein each of the panels includes four angled corner edges extending between the respective upper and side edges and lower and side edges and wherein the angled corner edges extend at a predetermined initial corner angle relative to the upper and lower edges;

the bladder having an initial height initial and wherein the initial corner angle has a maximum value of the inverse tangent of half of the height divided by the central width.

8. The inflatable restraint system of claim 7 wherein the initial corner angle is less than the maximum value.

9. An inflatable restraint system for protection of an occupant in a vehicle, the inflatable restraint system comprising:

an inflator for generating inflator gas; and
a bladder inflatable upon generation of gas by the inflator, the bladder including a forward panel, a rearward panel, and a pair of opposing end panels extending between and interconnecting the forward and rearward panels;

each of the forward and rearward panels having a generally octagonal shape.

10. An inflatable restraint system for protection of an occupant in a vehicle, the inflatable restraint system comprising:

an inflator for generating inflator gas; and a bladder inflatable upon generation of gas by the inflator, the bladder including a forward panel, a rearward panel, and a pair of opposing end panels extending between and interconnecting the forward and rearward panels;

the forward and rearward panels including upper edges joined to define an upper seam and lower edges joined to define a lower seam and wherein the bladder includes upper and lower rib portions reinforcing the upper and lower edges of the bladder, respectively, to limit deformation of the upper and lower edges during bladder inflation.

11. The inflatable restraint system of claim 10 wherein the upper and lower rib portions are separate pieces adhesively joined to the bladder.

12. An inflatable restraint system for protection of an occupant in a vehicle, the inflatable restraint system comprising:

an inflator for generating inflator gas; and a bladder inflatable upon generation of gas by the inflator, the bladder including a forward panel, a rearward panel, and a pair of opposing end panels extending between and interconnecting the forward and rearward panels;

the forward and rearward panels including upper edges joined to define an upper seam and lower edges joined to define a lower seam and wherein the bladder includes at least one rib portion reinforcing one of the upper and lower edges of the bladder, respectively, to limit deformation of the bladder during inflation.

* * * * *